L. GREENWOOD.
BEARING.
APPLICATION FILED MAR. 14, 1914.

1,185,656.

Patented June 6, 1916.

Inventor
Louis Greenwood
By Victor J. Evans
Attorney

Witnesses

UNITED STATES PATENT OFFICE.

LOUIS GREENWOOD, OF ST. JOHNSBURY, VERMONT.

BEARING.

1,185,656. Specification of Letters Patent. Patented June 6, 1916.

Application filed March 14, 1914. Serial No. 824,791.

*To all whom it may concern:*

Be it known that I, LOUIS GREENWOOD, a citizen of the United States, residing at St. Johnsbury, in the county of Caledonia and State of Vermont, have invented new and useful Improvements in Bearings, of which the following is a specification.

This invention relates to metallic bearings, and to a method of making the same, the object of the invention being to provide a welded composition metal bearing for use where hardened hand forged bearings are commonly employed, and which may be much more easily and cheaply manufactured and will last as efficiently in service.

A further object of the invention is to provide a method of making a composition metal bearing of this character.

The invention consists of the features of construction, combination and arrangement of parts herein fully described and claimed, reference being had to the accompanying drawing in which:—

Figure 1:
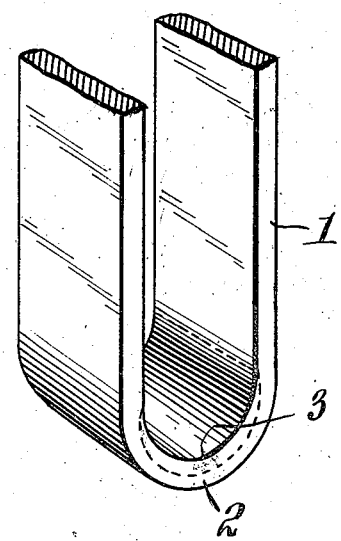
Figure 2:
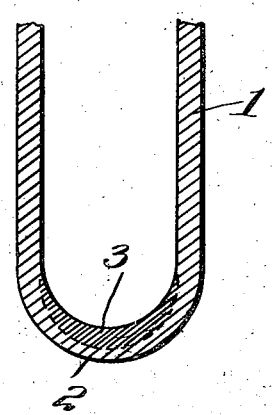

Figure 1 is a view showing the embodiment of the invention in a loop bearing of the type commonly employed in scales. Fig. 2 is a sectional view of the same.

In the construction of scales, loop bearings are very largely employed. These bearings are, to secure durability, made of hardened metal hand forged at the bight, such bearings being, as a consequence, comparatively expensive. Hand forged bearings are also used in other machines in various arts, where durability is a factor of importance. My invention provides a bearing, and a process of manufacturing the same, whereby a bearing made of comparatively soft metal may be produced in an inexpensive manner, and which will provide a tough and durable bearing surface, insuring efficiency and long usage.

Referring to the drawing, 1 designates a looped bearing commonly made of fine hardened steel, the bight portion 2 of which is ordinarily hand forged. In conformity with my invention, I make the bearing body, including the bight portion, of soft steel (steel casting) or wrought iron, and then weld into the bight portion 2 a bearing surface 3 of cast iron or other relative base metal. Through the process of welding the cast metal is combined with the soft steel or wrought iron at the bight and forms therewith a tough composition metal which resists wear to a material extent and insures long life to the bearing. By this construction and mode of manufacture the bearing may be produced at much less cost than hardened hand forged bearings, which is substantially equivalent in wearing qualities thereto. The same principle of construction and mode of manufacture may be employed in producing all kinds of bearings ordinarily hand forged.

It will be observed that by my invention the body of the bearing may be made of soft steel or wrought iron, comparatively low grade metals, to which a relatively base metal is welded to form a hard and tough bearing surface.

I claim:—

A bearing consisting of a substantially horseshoe-shaped body of metal of fine hardened steel, said body having a hand forged bight portion thinned down uniformly to provide a substantially crescent-shaped depression, and a crescent-shaped filler of a relatively baser metal united to said bight portion and fitted snugly in said depression, said crescent-shaped filler having its outer curve formed continuous with the sides of said bearing.

In testimony whereof I affix my signature in presence of two witnesses.

LOUIS GREENWOOD.

Witnesses:
JAMES B. CAMPBELL,
ALBRO F. NICHOLS.